Dec. 18, 1962    D. N. WOODCOCK ETAL    3,069,176
SEAL
Filed July 5, 1960

INVENTORS.
Donald N. Woodcock
Kenneth E. Streeter

BY Griswold & Burdick
ATTORNEYS

United States Patent Office 3,069,176
Patented Dec. 18, 1962

3,069,176
SEAL
Donald N. Woodcock, Freeland, and Kenneth E. Streeter, Midland, Mich., assignors to The Dow Chemical Company, Midland, Mich., a corporation of Delaware
Filed July 5, 1960, Ser. No. 40,758
3 Claims. (Cl. 277—74)

This invention relates to an improved seal for rotatable shafts. It more particularly relates to an improved seal for structures employing a rotatable shaft passing through an opening in a casing which seal prevents leakage of liquid through said opening and around said shaft.

It is a principal object of the present invention to provide an improved mechanical seal for a rotary shaft, the rotating and stationary sealing faces of which seal are self aligning while in operation.

Another object of the present invention is to provide a mechanical seal of the foregoing character which if subjected to excess pressures generated within the fluid system being handled absorbs such pressures so that the effective bearing seal between the rotating and stationary sealing faces is not affected thereby.

Another object is to provide a mechanical seal which is readily constructed due to improvements therein designed to facilitate assembly.

Additional objects and advantages of our invention will become apparent from the detailed description presented hereinafter when considered with reference to the accompanying drawings.

A preferred embodiment of our invention is illustrated in the accompanying drawings wherein the same parts in the different views are identified by the same numbers. In the drawings.

Figure 1:
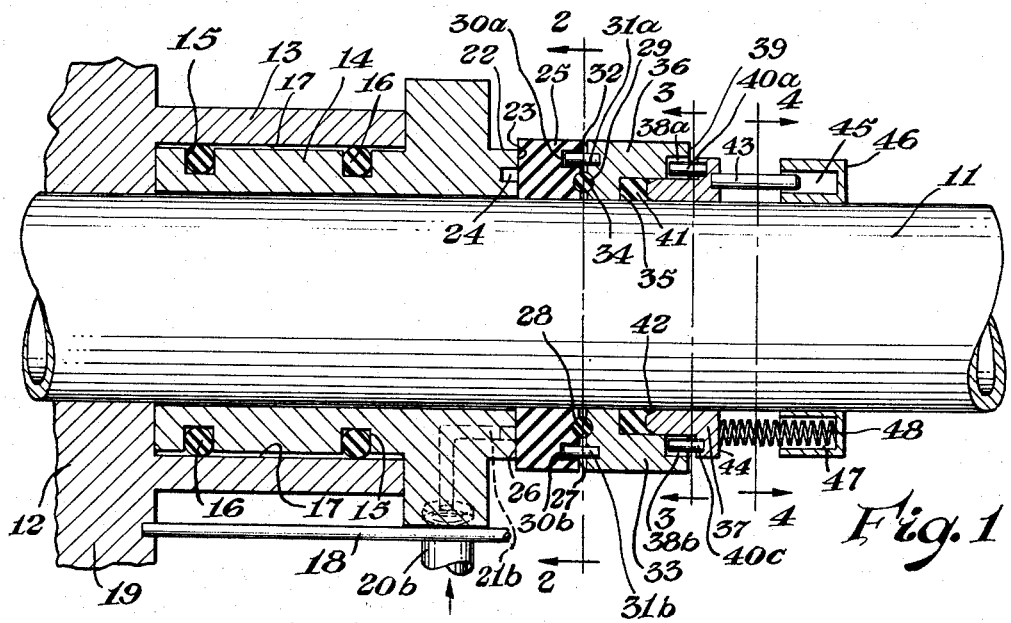
FIGURE 1 is a longtiudinal sectional view and side elevation of a mechanical seal of the present invention.
Figure 2:
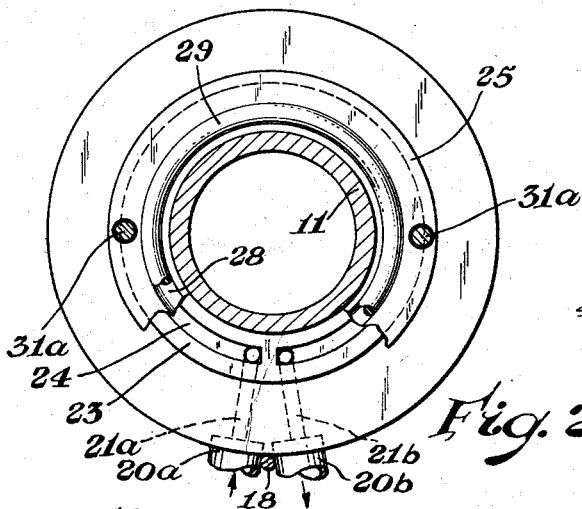
FIGURE 2 is a transverse sectional view partly cutaway taken along line 2—2 of FIGURE 1.
Figure 3:
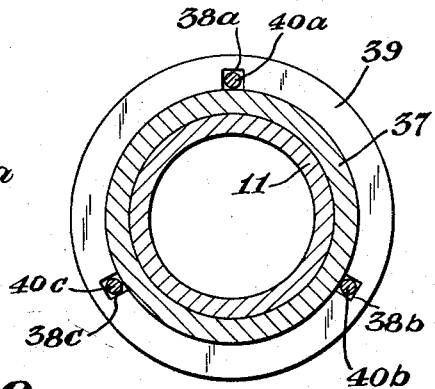
FIGURE 3 is a transverse sectional view taken along line 3—3 of FIGURE 1.
Figure 4:
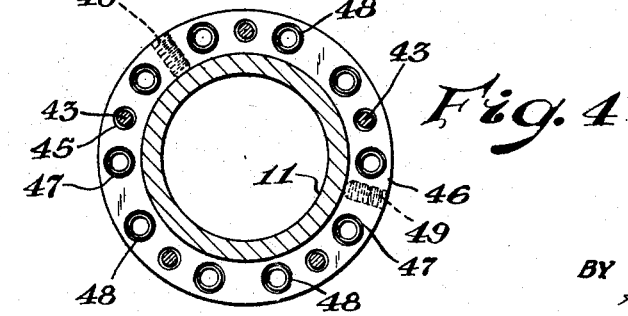
FIGURE 4 is a transverse sectional view taken along 4—4 of FIGURE 1.

Referring to the figures, reference numeral 11 indicates a rotatable shaft mounted for rotation in a casing or housing 12 having a stuffing box 13 through which the shaft 11 extends. Disposed within the stuffing box 13 is an annular element or cylinder block 14 having grooves 15 therein. The grooves 15 are adapted to receive rings 16 of packing material which bear against the wall 17 of the stuffing box 13. Block 14 is held against rotation in the stuffing box 13 by a pin 18 extending outwardly from the shoulder 19 of the casing housing 12 and passing between the V formed by pipes 20a—20b. The cylinder block 14 is provided with holes 21a—21b tapped therein to receive pipes 20a—20b. In turn the pipes 20a—20b are adapted for connection to a conventional lubricant circulating source (not shown). The block 14 is further provided with a protruding sleeve 22 which is machined or otherwise formed at its sealing face 23 to have a substantially circumferential groove 24 communicating also with the holes 21a—21b. The holes exit from the block 14 at the ends of the grove 24. The portion of the protruding sleeve 22 between the holes 21a—21b is left as part of the sealing face 23. This effectively blocks off the groove and thereby permits lubricant from the circulating source to flow in a preselected direction from one of the pipes, around the groove 24 and to return to the lubricant circulating source through the second pipe. The sealing face 23 may be better understood by reference to the transverse sectional view set forth in FIGURE 2.

A rotatable annular element or ring 25 whose face 26 is the rotating face mating with the stationary face 23, slides over the shaft 11 and bears against the stationary face 23 of member 14. The opposite face 27 of ring 25 is provided with a circumferential groove 28 adapted to receive an O-ring of packing material 29. The sealing face 27 is also provided with horizontal blind sockets 30a—30b which receive horizontal projections 31a—31b extending outwardly from face 32 of a sleeve 33 which slidably engages shaft 11. The face 32 of sleeve 33 further is provided with a circumferential groove 34 which is a mirror image of groove 28 and is adapted also to receive the ring of packing material 29 thereby providing a substantially perfect leak-proof seal between the ring 25 and the sleeve 33 as well as maintaining alignment between the rotating face 26 and stationary face 23 at all times.

The sleeve 33 is positioned on the shaft 11 with reference to the annular element 25 by inserting the projections 31a—31b respectively into sockets 30a—30b. This sleeve 33 has an inner packing seat or face 35 and is machined to have an under-cut section 36 which telescopes over a sealing ring 37. The sleeve 33 also is provided with blind horizontal sockets 38a—38b—38c in face 39 to receive a set of pins 40a—40b—40c respectively which project horizontally outward from ring 37. A packing ring of natural or synthetic rubber, "Teflon" or other suitable material, 41 is provided between the so-telescoped ring 37 and sleeve 33. This ring 41 is cut on one side to fit the bevelled edge 42 of the ring 37 and also coacts with the shaft 11. Movement of the ring 37 toward the sleeve 33 acts to expand the packing ring 41 into sealing engagement with the shaft 11.

The sealing ring 37 is provided with a second set of pins 43 spaced circumferentially around the ring projecting horizontantally outward from face 44 in the opposite direction to pins 40a—40b—40c. These pins are received by mating blind sockets 45 in a sealing collar 46. Collar 46 also has a second set of blind sockets 47, placed circumferentially around the collar between the first set of sockets 45. These sockets 47 are fitted to receive springs 48 which in turn contact face 44 of ring 37. Assembly of the four members, i.e., ring 25, sleeve 33, sealing ring 37 and collar 46 permits co-rotation of these four elements on shaft 11. The collar 46 is secured in a preselected position on the shaft 11 by means of set-screws 49. As the collar is fixed on the shaft, the coiled compression springs 48 act to urge the sealing ring 37 toward the sleeve 33 regardless of variations of the axial position of the shaft 11 relative to the stuffing box 13.

The materials of construction of the various parts of the instant sealing device can be those materials ordinarily used for such apparatus. However, it is understood that these materials will be selected in such a manner as to give leak-proof sealing under given sets of conditions in the presence of any of a number of specific materials. For example, in utilizing the device of the instant application to seal the rotating shaft of a pump utilized to pump concentrated sodium hydroxide (about 70 to 73 percent in sodium hydroxide concentration) solution at elevated temperatures (about 250° F.) substantially leak-proof sealing even after prolonged periods of usage resulted when the stationary sealing face of the cylinder block 14 was composed of "Z" Nickel and the rotating mating face of the ring 25 contacting the "Z" Nickel face was made of Teflon G (trademark of Du Pont Co. for a tetrafluoroethylene resin). "Z" Nickel as is understood in the art is an age-hardenable, wrought alloy containing about 94% nickel and about 4½% aluminum and is sold under the trademark of Duranickel. (See Metals Handbook, 8th ed., American Society for Metals, volume 1, page 1119, for the properties of "Z" Nickel.) The compression O-ring 29 utilized between the ring 25 and the sleeve 33 for such a pumping operation satisfactorily was prepared from either a synthetic or natural rubber.

In operation, with the parts arranged in the foregoing manner the cylinder block or packing element 14 remains substantially stationary along with casing 12 and stuffing box 13, while the ring 25, slevee 33, sealing ring 37 and collar 46 rotate with the shaft 11. Torsional strain on the packing ring 41 is relieved by the pin and slot connecting means between the sleeve 33 and the ring 37. Axial misalignment between the shaft 11 and the bore of the annular element 14 is absorbed by these parts so that the various seals are not disturbed, especially the bearing seal between rotating face 26 of the ring 25 and the stationary face 23 of the annular member 14.

In the embodiment illustrated, it will be perceived that we have supplied a mechanical seal which is efficiently operative regardless of variations in the position of the shaft to which it is applied. The mechanical seal of the present invention is characterized by the fact that torsional stress is removed from the packing member 41.

Various modifications can be made in the present invention without departing from the spirit or scope thereof for it is understood that we limit ourselves only as defined in the appended claims.

We claim:

1. In a seal for a rotatable shaft which consists of a shaft, casing, a block carried in a stuffing box in the casing and sealed thereto, a seal face presented by the block with means for providing lubricant to the face, a sleeve running in sealing contact with the said face and counter bored on the opposite end for receiving packing material, a sealing ring pinned to said sleeve and forced against said packing by springs reacting against a shaft affixed collar to which said sealing ring is pinned the improvement which comprises; providing a ring between said block and said sleeve, said ring running in sealing contact with said sealing face of said block, said ring and said sleeve having mating grooves adapted to receive an O-ring, and an O-ring positioned in said grooves of said ring and said sleeve.

2. The seal as defined in claim 1 wherein the sealing face of the block is "Z" Nickel, the ring between the block and the sleeve is Teflon G and the O-ring is rubber.

3. In a seal for a rotatable shaft which consists of a casing having a stuffing box through which said shaft extends, an annular cylinder block held against rotation in said stuffing box, said block having a "Z" Nickel seal face and means for providing lubricant to said face, a sleeve disposed on said shaft, a packing material, a sealing ring in telescoping relationship to said sleeve, a slot and pin connection between said sleeve and said sealing ring, said packing material disposed around said shaft between said sleeve and said sealing ring, a collar fixed to said shaft, said collar having spaced longitudinal sockets mating with pins in said sealing ring, said collar having a second set of sockets spaced between said first sockets and compression springs disposed in said second set of sockets contacting said sealing ring the improvement which comprises, providing a tetrafluoroethylene resin ring between said cylinder block and said sleeve, said ring bearing in sealing contact against said seal face of said block and said ring being provided with a circumferential groove on the face of said ring opposite said block and said ring having horizontal sockets on the face containing said groove, the face of said sleeve abutting the face of said ring being provided with a circumferential groove the same as that in said ring and said sleeve being provided with horizontal projections mating with the sockets in said ring, and a rubber O-ring fitting into the circumferential grooves in said ring and sleeve when said ring and sleeve are in abutting relationship.

References Cited in the file of this patent
UNITED STATES PATENTS
2,122,461     Kohler _____ Mar. 29, 1938

UNITED STATES PATENT OFFICE
CERTIFICATE OF CORRECTION

Patent No. 3,069,176 December 18, 1962

Donald N. Woodcock et al.

It is hereby certified that error appears in the above numbered patent requiring correction and that the said Letters Patent should read as corrected below.

Column 4, under "References Cited", for the patent number "2,122,461" read -- 2,412,461 --.

Signed and sealed this 19th day of March 1963.

(SEAL)
Attest:

ESTON G. JOHNSON

Attesting Officer

DAVID L. LADD

Commissioner of Patents